July 2, 1968     E. L. EMERICK, JR., ET AL     3,390,503
THERMALLY RESPONSIVE BEAM JOINT
Filed Sept. 10, 1965     2 Sheets-Sheet 1
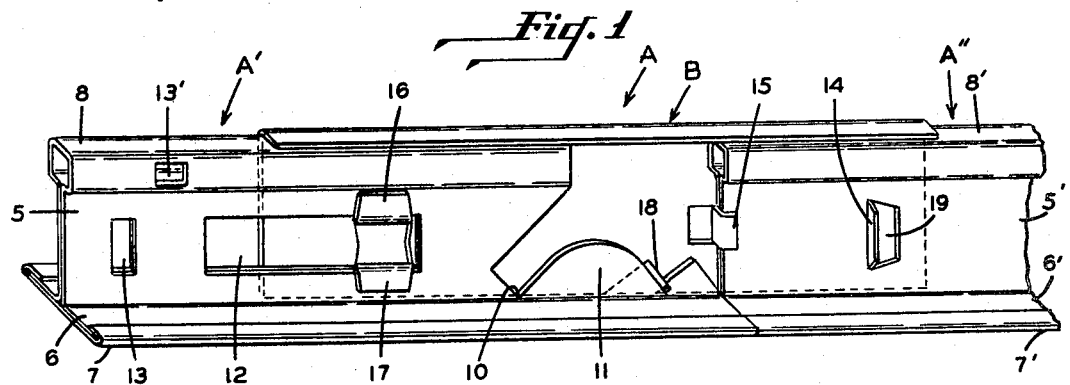
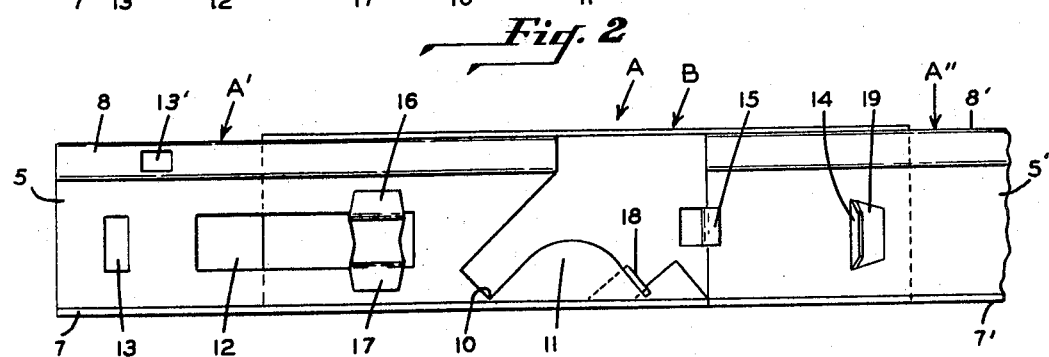
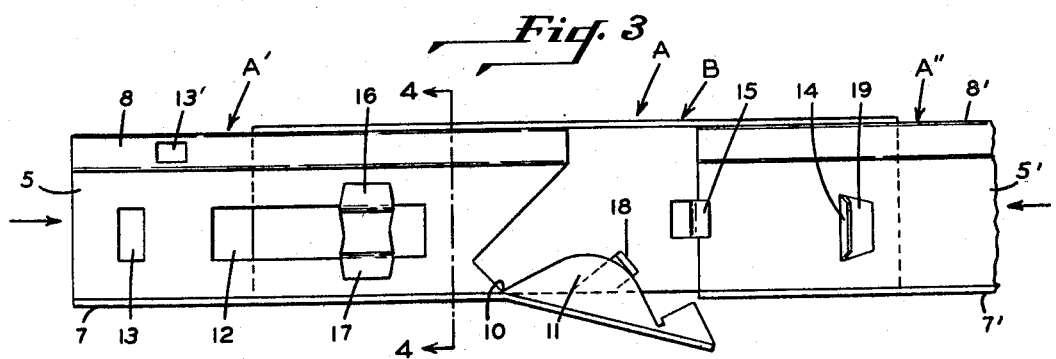
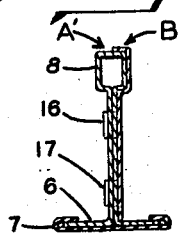
INVENTOR
ERNEST L. EMERICK, JR.
JAMES C. OLLINGER
HENRY J. ROUX
BY
ATTORNEY July 2, 1968     E. L. EMERICK, JR., ET AL     3,390,503
THERMALLY RESPONSIVE BEAM JOINT
Filed Sept. 10, 1965     2 Sheets-Sheet 2
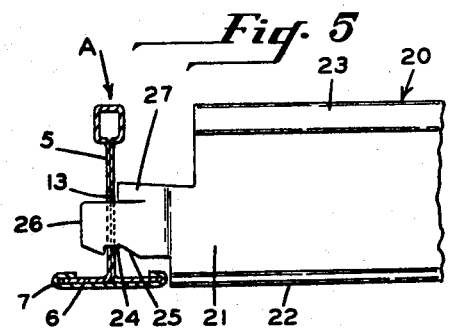
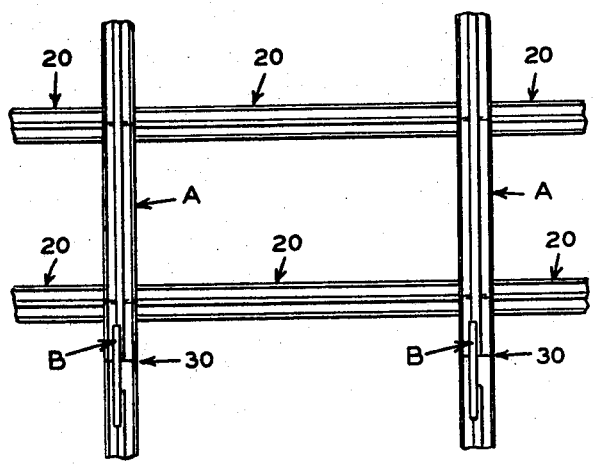
INVENTOR
ERNEST L. EMERICK, JR.
JAMES C. OLLINGER
HENRY J. ROUX
ATTORNEY United States Patent Office 3,390,503
Patented July 2, 1968

3,390,503
THERMALLY RESPONSIVE BEAM JOINT
Ernest L. Emerick, Jr., Landisville, James C. Ollinger, Lancaster, and Henry J. Roux, Willow Street, Pa., assignors to Armstrong Cork Company, Lancaster, Pa., a corporation of Pennsylvania
Filed Sept. 10, 1965, Ser. No. 486,306
4 Claims. (Cl. 52—573)

ABSTRACT OF THE DISCLOSURE

A controlled expansion thermally responsive joint for a structural beam, said joint having two abutting beam members which include webs and panel-supporting flanges, one of the abutting members having the web partially removed to form a flange deformation localizing notch and a cam in the web between the notch and the abutting flange extremity, and a splicing plate bridging the adjacent extremities of the abutting beam members the splicing plate including a member adapted to engage the cam on expansion and force it down to open the joint.

This invention relates generally to a thermally responsive grid structure adapted to support a plurality of panel members in a substantially rigid common plane, and more particularly relates to a main beam for use in a grid structure for fire retardant suspended ceilings.

Metallic structural members when exposed to high temperatures undergo considerable expansion. In a grid structure which is adapted to support a plurality of panel members in a substantially rigid common plane, such as a grid structures used for supporting a plurality of panel members in forming suspended ceilings, the metallic structural members undergo considerable linear expansion during a fire and, unless means are provided in the grid structure system for absorbing the increase in length of the various members due to thermal expansion, long structural members bend and become disengaged from the panel components of the ceiling supported thereby, Thus, even though the panel members themselves might be formed of fire resistant materials, the structure will not operate to retard the spread of the fire unless the grid structure maintains the panels in position.

The primary object of this invention is to provide a main beam for use in a thermally responsive grid structure which is adapted to support a plurality of panel members in a substantially rigid common plane and which will, under elevated temperatures, maintain the relative spacial arrangement of the supporting structural members substantially the same. An ancillary object of this invention is to provide a main structural beam member which is characterized by means for isolating to a particular portion of the beam the deformation of the beam due to thermal expansion.

Summary of the invention

Metallic structural members adapted for supporting ceiling panel members undergo considerable expansion when exposed to high temperatures. In order to localize the expansion at a single point so as to prevent buckling and twisting of the beam members, in the case of excessive thermal expansion in the members, expansion joints are often provided. The subject invention relates to an improved expansion joint whereby thermal expansion in the main structural beams is confined at one point, the joint providing for controlled thermal expansion and including means whereby one section of the main beam is positively forced to an open position upon thermal expansion.

The invention will be more fully understood and further objects and advantages thereof will become apparent when reference is made to the more detailed description of preferred embodiments of the invention which follows and to the appended drawings in which:

FIGURE 1 is a perspective view of a portion of a main structural beam showing the controlled expansion thermally responsive joint of the present invention;

FIGURES 2 and 3 are plan views of a main structural beam such as shown in FIGURE 1 showing the normal and expanded position;

FIGURE 4 is a cross-sectional view taken along line 4—4 of FIGURE 3;

FIGURE 5 is a fragmentary cross-sectional view showing the interlocking of a cross beam with a main structural beam; and FIGURE 6 illustrates a portion of a suspended ceiling grid embodying the principles of the present invention.

In accordange with our invention, we have provided a main structural beam having a controlled expansion thermally responsive joint for use in a thermally responsive grid system which is adapted to support a plurality of panel members in a substantially rigid common plane and which, in the presence of high temperatures, is designed to absorb thermal expansion in the main beam brought about by such high temperatures. The main beam is especially adapted to maintain the relative spacial arrangement of the supporting structural members for the support of the ceiling panel members in the event of fire thus preventing buckling of the grid system and breakage or the dropping out of panel members. The main beam is also particularly adapted for use with cross beam members in forming a grid structure in which the cross beams are further adapted to coact with the main beam in the event of thermal expansion to allow linear expansion in the cross beam to take place without disturbing the spacial arrangement of the cross and main beams.

In a suspended grid assembly or system, a plurality of main structural beams are generally disposed in spaced parallel relation. The spacing generally corresponds to one dimension of a panel or tile member, for example a fire retardant acoustical tile, to be supported thereby. The space between adjacent main structural beams is likewise subdivided by means of cross beams conveniently disposed on centers which accommodate the remaining dimension of the tile member to be suspended thereby. The web portion of the spaced main beams generally have spaced apertures which are adapted to support the cross beams at their extremities in a substantially perpendicular arrangement to the main beam. The thermally responsive joint of the present invention is characterized by first and second structural beam members having panel supporting flanges along at least one lower edge thereof with the beam members being in substantially abutting relation at the adjacent extremities thereof and a splicing plate bridging the adjacent extremities of the beams. The first of the beam members has the web thereof partially removed to form a flange deformation localizing notch extending substantially to the plane of the flange and a cam between the notch and the abutting extremity of the flange. The splicing plate is slidably secured to the first beam and is fixedly secured to the second beam. A cam engaging member is fixedly secured to the second beam and is adapted to engage the cam so that on expansion the cam is forced down to open the joint. The beam is supported against deflection under load in the region of the cutout portion by means of the splicing plate which coacts with the beam members and spans the cutout portion of the web. When the temperature of the beam is raised substantially, the expansion of the main beam is taken up in the controlled expansion thermally responsive joint.

Referring now more particularly to the drawings, there is shown in FIGURE 1 in perspective view a structural beam having a controlled expansion thermally responsive joint in accordance with this invention. The beam A of the present invention is preferably formed of steel plate, for example, electro-zinc coated cold rolled steel 0.020 inch thick formed about a mandrel and provided with a web portion and panel supporting flanges along the lower edge. In accordance with our invention, the structural beam is comprised of first and second structural beam members having, in addition to the web portion and panel-supporting flanges, a bead along the upper edge of the web. The first and second structural beam members are conveniently designated A' and A" and the respective webs, 5 and 5', the respective panel-supporting flanges 6 and 6', the respective beads 8 and 8', and the decorative caps 7 and 7'. The panel-supporting flange disposed along the lower edge of the web is a continuous flange which in the preferred embodiment shown in FIGURE 1 is preferably perpendicular to and bisected by the web, i.e., T-shaped. The decorative cap is wrapped about the marginal edges of the flange in order to cover the fold line and to provide a decorative exposed surface. The cap is conveniently formed from enameled cold rolled steel 0.013 inch thick.

The structural beam members are additionally provided with a plurality of apertures 13 for receiving connector portions of a cross beam as will be more fully hereinafter illustrated and with a series of perforations 13' to aid in suspending the beam from a main ceiling. As further shown in FIGURE 1, at the extremity of the first structural beam member A' adjacent the second structural beam member A", the web 5 is partially removed so as to form a flange deformation localizing notch 10 positioned in from the extremity of beam member A' and extending substantially to the plane of flange 6 and is also partially removed to additionally provide a cam 11 in the web portion between notch 10 and the abutting extremity of flange 6. A splicing plate B is utilized to form a joint by bridging the adjacent extremities of the first and second structural beam members A' and A". It is fixedly secured to beam member A" by folding tabs 14 and 15, which are integrally formed in the splicing plate, about the second structural beam member A" as shown in FIGURE 1. Tab 14 is first inserted through aperture 19 in A" before folding. Two additional tabs 16 and 17 are formed in the splicing plate for slidably securing the splicing plate to structural beam member A' by inserting the tabs in slot 12 formed in structural beam member A' and folding them back over A' as shown. A cam engaging member, tab 18, is formed integrally in the splicing plate B and is folded back over cam 11.

The action of the controlled expansion thermally responsive joint in structural beam A is more clearly illustrated in FIGURES 2 and 3 which are plan views of the main structural beam showing the normal and expanded position thereof. Since the structural beam, when positioned in a grid assembly in a suspended ceiling, is fixedly secured at its terminal ends, the direction of expansion is as illustrated by means of the arrows in FIGURE 3. As is clearly illustrated in FIGURES 2 and 3, on expansion of beam A, tab 18 engages cam 11 and forces cam 11 down to open up the joint, the flange 6 pivoting around the deformation localizing notch 10. Since the splicing plate B is fixedly secured to the second structural beam member A", it does not move relative thereto but moves relative to the first structural beam member A', sliding within slot 12.

FIGURE 4 shows the details of the cross-sectional view taken along line 4—4 of FIGURE 3 showing the positioning of the splicing plate B relative to structural beam member A' and showing the positioning of the tabs illustrated at 16 and 17.

FIGURE 5, which is a fragmentary cross-sectional view, shows the interlocking of a cross beam 20 with a main structural beam A. The main structural beam A includes a web portion 5 having an aperture 13 therein and having panel supporting flanges 6 along the lower edge thereof along with a decorative cap 7. When the connector portion 26 is inserted into the aperture 13, it is positioned therein by means of notch 24, the height of notch 24 being such as to bring decorative cap 7 into alignment in a substantially common plane with flange 22 of cross beam 20. Deformable stop 27, formed in the upper edge of the connector portion 26 in spaced relation from notch 24, coacts with the notch 24 and web 5 to position flanges 6 and 22 in substantially abutting relationship. As the cross beam expands, stop 27 deforms allowing the shoulder portion 25 to ride up on the lower edge of aperture 13 whereby the flange 22 of the cross beam is lifted over the flange 6 of main beam A. The cap 7 is loosely wrapped around flange 6 as shown in FIGURE 5 so that it is free to buckle should flange 22 engage the cap 7 on the initial stage of expansion. Connector portion 26 is relatively flexible with respect to web 21 so that it is free to bend where it is free of the restricting effects of bead 23 and flange 22 and will thus compensate for any elongation of main beam A.

FIGURE 6 shows a portion of a suspended ceiling grid containing the structural elements shown in FIGURES 1 and 5. The rectangles defined by a pair of spaced parallel main beams A having controlled expansion thermally responsive joints 30 such as shown in FIGURE 1 and a pair of spaced parallel cross beams 20 such as shown in FIGURE 5 are conveniently adjusted to correspond with marginal dimensions of a standard tile or panel insert, such as a fire retardant acoustical tile, e.g., 24 x 48 inches. Such members are conveniently disposed in the frame so defined with their marginal edges resting on the flanges of the respective members. Viewed from the underside, this provides a decorative suspended ceiling characterized by the added advantage that in the event of fire, the supporting beams will not become so distorted that the dimensions of the supporting grid will exceed the dimensions of tile members supported thereby thus permitting the latter to fall. The effect of this is to maintain intact the insulating barrier afforded by the suspended ceiling and the dead air space between the suspended ceiling and the main ceiling thus insulating the structure of the main ceiling from excessive temperatures in the room.

The systems of the present invention are particularly characterized in that expansion of a long main beam section is accumulated for such long section and localized at one point. It will be seen that moving longitudinally from a fixed point on the main beam, the displacing force on the cross beam will be slight, and as the expansion point is approached, the longitudinal displacement wth respect to each succeeding crossing beam increases. However, the coaction of the connecting portion of the cross beam with the main beam is able to absorb this displacement and the flanges of the cross beams do not become disengaged from the members supported thereby. Elongation of the cross beams themselves, although not a feature of this invention, is provided by means of the coacting interlocking relationship between the connector portion of the cross beam and the web containing the aperture in the main beam and provides for taking up expansion during an increased temperature in the cross beam members. This coaction between the main beams and the cross beams and the main beam joint design allows for thermal elongation of both members so the spacial relationship of the cross beams with the main beams is maintained and, under circumstances of excessive temperatures, tiles or panels supported by the structure remain in place and preserve the insulation effect of the tiles or panels and of a dead air space on the reverse side thereof.

We claim:

1. In a structural beam, a controlled expansion thermally responsive joint comprised of:

first and second structural beam members having web portions and panel-supporting flanges along at least one lower edge thereof, said beam members being in substantially abutting relation at the adjacent extremities thereof;

the first of said beam members having the web partially removed forming a flange deformation localizing notch extending substantially to the plane of said flange and a cam projecting upwardly within said notch between the abutting extremity of said flange and the end of said web;

a splicing plate bridging the adjacent extremities of said beams, said plate being slidably secured to said first beam and fixedly secured to said second beam; and a member projecting from said splicing plate and adapted to engage said cam on expansion whereby the cam is forced down to open the joint.

2. The structural beam in accordance with claim 1 in which the cam engaging member is formed integrally with said splicing plate.

3. A grid system for supporting a plurality of panel members in a common plane comprising, in combination, a plurality of main structural beams disposed in spaced parallel relation, each of said beams having a controlled expansion thermally responsive joint comprised of:

first and second structural beam members having web portions and panel-supporting flanges along at least one lower edge thereof, said beam members being in substantially abutting relation at the adjacent extremities thereof;

the first of said beam members having the web partially removed forming a flange deformation localizing notch extending substantially to the plane of said flange and a cam projecting upwardly within said notch between the abutting extremity of said flange and the end of said web;

a splicing plate bridging the adjacent extremities of said beams, said plate being slidably secured to said first beam and fixedly secured to said second beam;

a member projecting from said splicing plate and adapted to engage said cam on expansion whereby the cam is forced down to open the joint; and a plurality of cross beams disposed in spaced parallel relation transverse to the main beams and in substantially the same common plane, to provide a predetermined geometric grid configuration, each of said cross beams including a web portion and a panel-supporting flange along at least one lower edge adapted to coact with the flanges of said main beams to provide peripheral support for panel members, means at the extremities of said cross beams coacting in interlocking supporting relation with the corresponding main beams, and means at the extremities of said cross beams coacting with the corresponding main beams in response to expansion of the main and cross beams to maintain substantially the predetermined grid configuration without disturbing panel members supported thereby.

4. The grid system in accordance with claim 3 in which the cam engaging member is formed integrally with said splicing plate.

References Cited

UNITED STATES PATENTS

| | | | |
|---|---|---|---|
| 3,175,655 | 3/1965 | Brown et al. | 52—573 X |
| 3,189,139 | 6/1965 | Znamirowski et al. | 52—573 |
| 3,284,977 | 11/1966 | Lickliter et al. | 52—573 |
| 3,290,075 | 12/1966 | Jahn | 52—484 |

FOREIGN PATENTS

| | | |
|---|---|---|
| 808,885 | 7/1951 | Germany. |

HENRY C. SUTHERLAND, *Primary Examiner.*

FRANK ABBOTT, *Examiner.*